(12) United States Patent
Kawarada

(10) Patent No.: US 9,277,111 B2
(45) Date of Patent: Mar. 1, 2016

(54) IMAGE CAPTURE APPARATUS AND CONTROL METHOD THEREFOR

(71) Applicant: CANON KABUSHIKI KAISHA, Tokyo (JP)

(72) Inventor: Masahiro Kawarada, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 327 days.

(21) Appl. No.: 13/888,424

(22) Filed: May 7, 2013

(65) Prior Publication Data

US 2013/0307993 A1 Nov. 21, 2013

(30) Foreign Application Priority Data

May 18, 2012 (JP) ................. 2012-114992
May 18, 2012 (JP) ................. 2012-114993
May 18, 2012 (JP) ................. 2012-114994

(51) Int. Cl.
*H04N 5/232* (2006.01)

(52) U.S. Cl.
CPC ....... *H04N 5/23212* (2013.01); *H04N 5/23219* (2013.01)

(58) Field of Classification Search
CPC ........................................................ H04N 5/23
USPC ................. 348/169, 207.99, 222.1
See application file for complete search history.

(56) References Cited

U.S. PATENT DOCUMENTS

| 5,692,222 | A * | 11/1997 | Yamada et al. | 396/51 |
| 6,115,146 | A * | 9/2000 | Suzuki et al. | 358/474 |
| 2007/0230937 | A1* | 10/2007 | Ide et al. | 396/125 |
| 2008/0002960 | A1* | 1/2008 | Ito et al. | 396/125 |
| 2008/0068487 | A1* | 3/2008 | Morita | 348/333.05 |
| 2008/0136958 | A1* | 6/2008 | Nakahara | 348/345 |
| 2008/0284901 | A1* | 11/2008 | Misawa | 348/349 |
| 2010/0086292 | A1* | 4/2010 | Byun et al. | 396/80 |
| 2010/0253800 | A1* | 10/2010 | Miya et al. | 348/222.1 |
| 2011/0164866 | A1* | 7/2011 | Kayama et al. | 396/100 |
| 2012/0120305 | A1* | 5/2012 | Takahashi | 348/352 |

(Continued)

FOREIGN PATENT DOCUMENTS

| JP | 2003-156680 A | 5/2003 |
| JP | 2003241067 A | 8/2003 |
| JP | 2008-076786 A | 4/2008 |
| JP | 2009-053448 A | 3/2009 |

(Continued)

OTHER PUBLICATIONS

Japanese Office Action issued in corresponding Application No. JP2012114992 on Dec. 22, 2015.
Japanese Office Action in corresponding Application No. JP2012114993 issued on Jan. 5, 2016.

*Primary Examiner* — Paulos M Natnael
(74) *Attorney, Agent, or Firm* — Carter, DeLuca, Farrell & Schmidt, LLP

(57) ABSTRACT

A specific subject region is detected, and if a focus detection area that is encompassed in the specific subject region is present, focus detection is performed on that focus detection area. This makes it possible to reduce the influence of a conflict between far and near subjects and reduce the amount of time required for focus detection in an image capture apparatus and in a control method therefor, the image capture apparatus being for performing automatic focus detection based on contrast evaluation values for a plurality of focus detection areas that are each located at a fixed position and each has a fixed size.

15 Claims, 10 Drawing Sheets

(56) References Cited

U.S. PATENT DOCUMENTS

2013/0293766 A1* 11/2013 Sugimoto ................. 348/345
2014/0016021 A1* 1/2014 Uchida ..................... 348/353

FOREIGN PATENT DOCUMENTS

| | | |
|---|---|---|
| JP | 2010-039200 A | 2/2010 |
| JP | 2010186004 A | 8/2010 |

* cited by examiner

F I G. 3
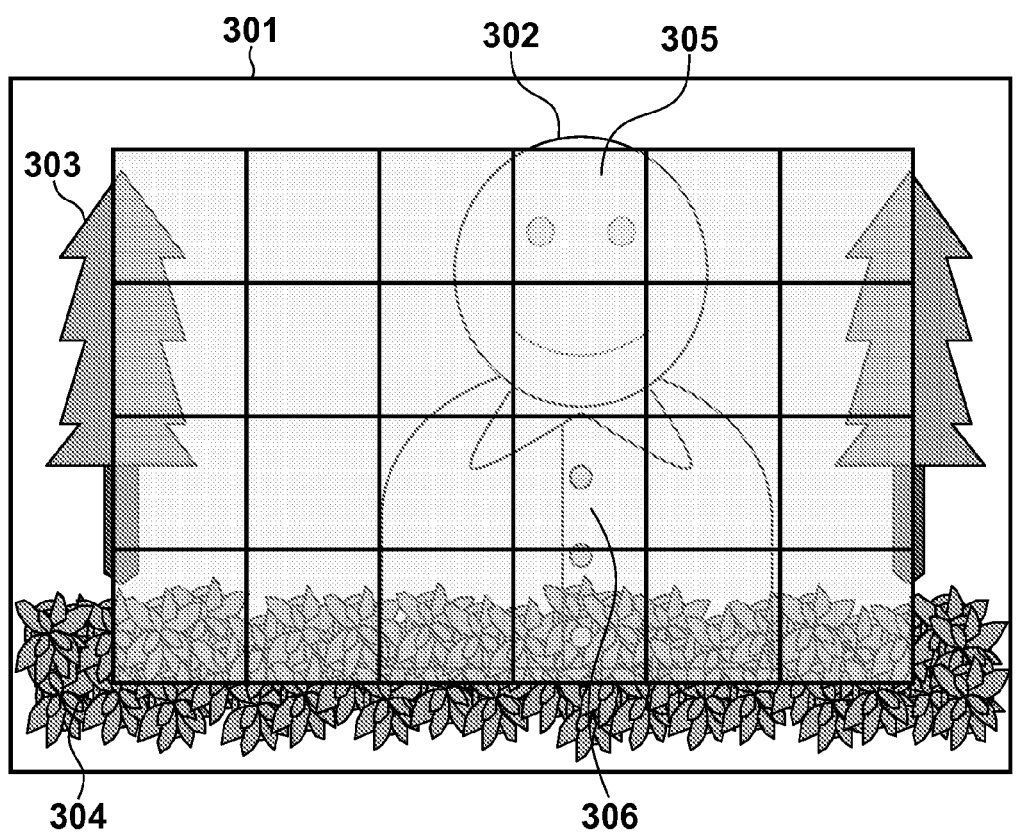

F I G. 7
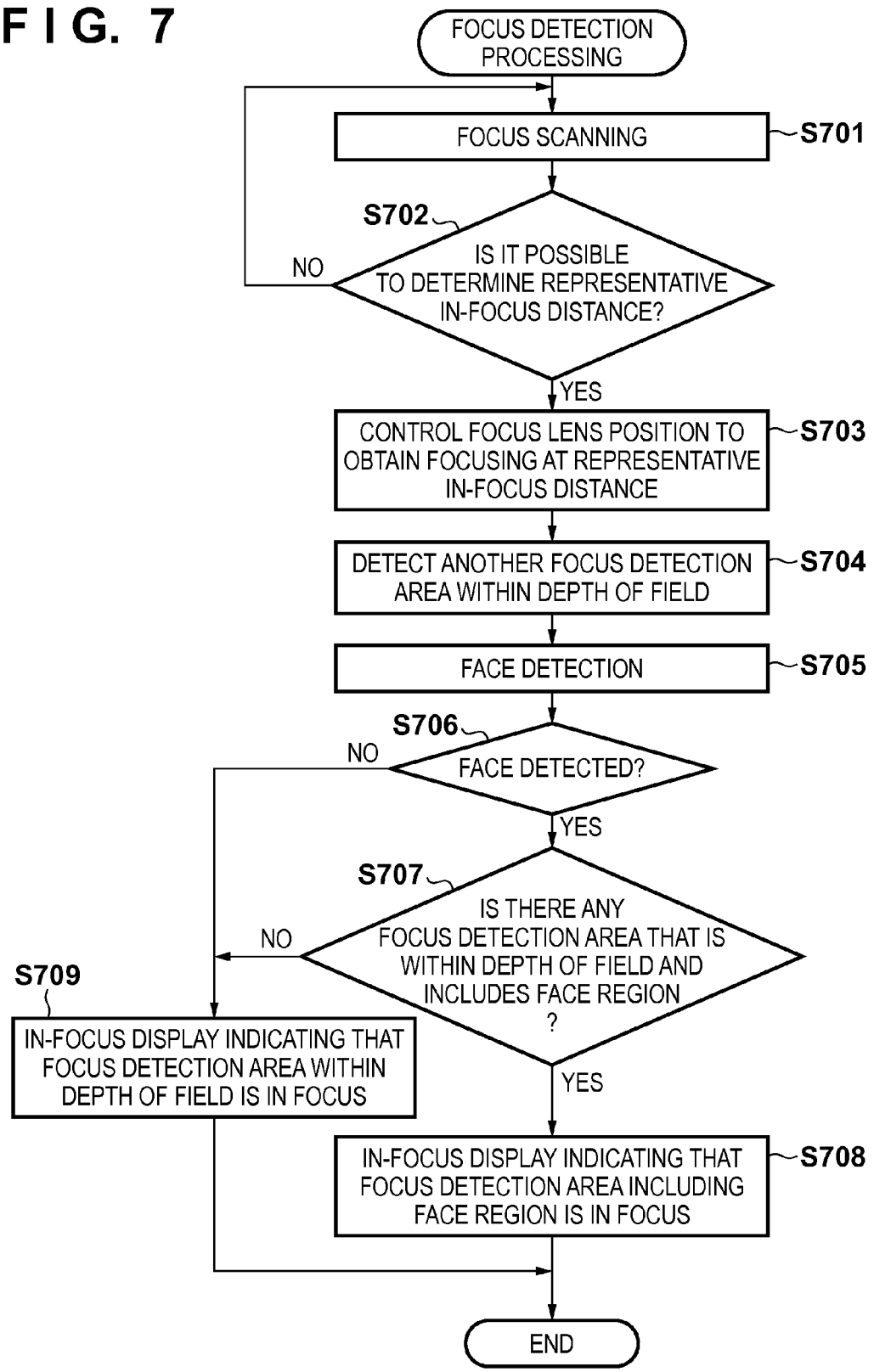

IMAGE CAPTURE APPARATUS AND CONTROL METHOD THEREFOR

BACKGROUND OF THE INVENTION

1. Field of the Invention

The present invention relates to an image capture apparatus and a control method therefor, and in particular, relates to an image capture apparatus for performing automatic focus detection based on contrast evaluation values and a method for controlling the image capture apparatus.

2. Description of the Related Art

An image capture apparatus is known in which a specific subject, such as a person's face, is focused on by performing automatic focus detection based on contrast evaluation values for focus detection areas that include the specific subject among a plurality of focus detection areas that are each located at a fixed position and each has a fixed size (Japanese Patent Laid-Open No. 2010-39200).

Bringing the focus to a subject is, however, not always easy when the automatic focus detection based on contrast evaluation values is applied to focus detection areas that are each located at a fixed position and each has a fixed size, unlike cases in which the positions and sizes of focus detection areas are set in accordance with a detected subject region. This is because when a single focus detection area includes a plurality of subjects that are located at very different distances, a conflict will arise between contrast evaluation values of far and near subjects.

In particular, the possibility of not being able to perform proper focus detection increases when each focus detection area includes only a small portion of a subject that is intended to be focused on. Such a situation can arise, for example, when the face of a person who is at a much closer distance than the background is intended to be focused on and automatic focus detection based on contrast evaluation values (contrast AF) is performed on a focus detection area that includes only a small portion of a face region.

In order to mitigate this problem, Japanese Patent Laid-Open No. 2010-39200 discloses a technique in which priorities are assigned to focus detection areas, and a focus detection area to be ultimately focused on is selected according to the focus detection results for focus detection areas having high priority. This technique, however, requires sorting according to priority, and also requires a longer time for focus detection because, irrespective of priority, focus detection is performed on all focus detection areas that include the face.

The focus detection based on contrast evaluation values (contrast AF) in principle has a difficulty in bringing the focus to a low-contrast subject. Thus, not the contrast on the center portion of a person's face but the contrast at the contour of the face is likely to be captured when focus detection is performed on a focus detection area that includes only a portion of the face. This may result in failing to detect the focus (failing to detect an in-focus distance) in the center portion of the face, such as the eyes and the mouth, and being able to detect the focus only in focus detection areas that include portions forming the contour of the face, such as the ears.

Incidentally, an in-focus display is known in which a frame-shaped indicator is superimposed on an EVF image in order to explicitly inform the user of focus detection areas in which the focus can be detected. In the case of the above-described example, however, there could possibly be a situation in which indicators for focus detection areas that correspond to the contour portion of the face are displayed because their focuses can be detected, but indicators for focus detection areas that correspond to the center portion of the face are not displayed because their focuses cannot be detected.

In this case, there is a problem in that it is difficult to discriminate whether or not the face is focused on because no indicates are displayed for the focus detection areas corresponding to the center portion of the face. In particular, such a situation that the focus is detected in only the contour portion is likely to occur when the face portion is underexposed and the background is bright, as in a backlight scene or when the face portion is overexposed due to direct sunlight.

SUMMARY OF THE INVENTION

The present invention has been conceived in order to improve at least one of the above-described conventional problems. The present invention enables, for example, the influence of a conflict between far and near subjects and the amount of time required for focus detection to be reduced in an image capture apparatus for performing automatic focus detection based on contrast evaluation values for a plurality of focus detection areas that are each located at a fixed position and each has a fixed size and in a method for controlling the image capture apparatus.

The present invention also enables an appropriate in-focus display in an image capture apparatus for performing automatic focus detection based on contrast evaluation values for a plurality of focus detection areas that are each located at a fixed position and each has a fixed size and in a method for controlling the image capture apparatus.

According to one aspect of the present invention, there is provided an image capture apparatus comprising: a focus detection unit configured to perform focus detection based on a contrast evaluation value for an image included in a focus detection area; a subject detection unit configured to detect a region of a specific subject from an image; and a selection unit configured to select at least one focus detection area on which focus detection is performed by the focus detection unit, from among a plurality of preset focus detection areas that are each located at a fixed position and each has a fixed size, wherein the selection unit is configured to, when the region of the specific subject is detected and a focus detection area that is encompassed in the region of the specific subject is present among the plurality of preset focus detection areas, select the focus detection area that is encompassed in the region of the specific subject, and when the region of the specific subject is detected and no focus detection area that is encompassed in the region of the specific subject is present among the plurality of preset focus detection areas, select at least one predetermined focus detection area from among the plurality of preset focus detection areas.

According to another aspect of the present invention, there is provided an image capture apparatus comprising: a focus detection unit configured to set a plurality of focus detection areas that are each located at a fixed position and each has a fixed size, and for each of the focus detection areas, detect an in-focus distance based on a contrast evaluation value for an image; a subject detection unit configured to detect a region of a specific subject from an image; a determination unit configured to determine a representative in-focus distance based on the in-focus distances detected by the focus detection unit; and an in-focus display unit configured to, when a focus detection area that includes the region of the specific subject is present among a focus detection area whose in-focus distance detected by the focus detection unit is within a depth of field of the representative in-focus distance, provide a display indicating that every focus detection area that includes the region of the specific subject is in focus among the plurality of preset focus detection areas.

According to yet another aspect of the present invention, there is provided an image capture apparatus comprising: a focus detection unit configured to detect an in-focus distance of a focus detection area based on a contrast evaluation value for an image included in the focus detection area; a subject detection unit configured to detect a region of a specific subject from an image; a selection unit configured to select a focus detection area for which an in-focus distance is detected by the focus detection unit, from among a plurality of preset focus detection areas that are each located at a fixed position and each has a fixed size; a determination unit configured to determine a representative in-focus distance based on an in-focus distance detected by the focus detection unit; and an in-focus display unit configured to provide a display indicating that a focus detection area whose in-focus distance detected by the focus detection unit is within a depth of field of the representative in-focus distance is in focus among the plurality of preset focus detection areas, wherein the selection unit is configured to, when the region of the specific subject is detected and a focus detection area that is encompassed in the region of the specific subject is present among the plurality of preset focus detection areas, select the focus detection area that is encompassed in the region of the specific subject, and when no focus detection area that is encompassed in the region of the specific subject is present among the plurality of preset focus detection areas, select at least one predetermined focus detection area from among the plurality of preset focus detection areas, and the in-focus display unit is configured to, when a focus detection area that includes the region of the specific subject is present among a focus detection area whose in-focus distance detected by the focus detection unit is within a depth of field of the representative in-focus distance, provide a display indicating that every focus detection area that includes the region of the specific subject is in focus among the plurality of preset focus detection areas.

Further features of the present invention will become apparent from the following description of exemplary embodiments with reference to the attached drawings.

BRIEF DESCRIPTION OF THE DRAWINGS

FIG. 3 schematically shows an example of a plurality of focus detection areas that are set in a digital camera according to an embodiment of the present invention.

FIG. 7 is a flowchart illustrating a focus detection operation performed by a digital camera according to a second embodiment of the present invention.

DESCRIPTION OF THE EMBODIMENTS

Exemplary embodiments of the present invention will now be described in detail in accordance with the accompanying drawings.

First Embodiment

Hereinafter, an exemplary embodiment of the present invention will be described in detail with reference to drawings.

Configuration of Digital Camera

Figure 1:
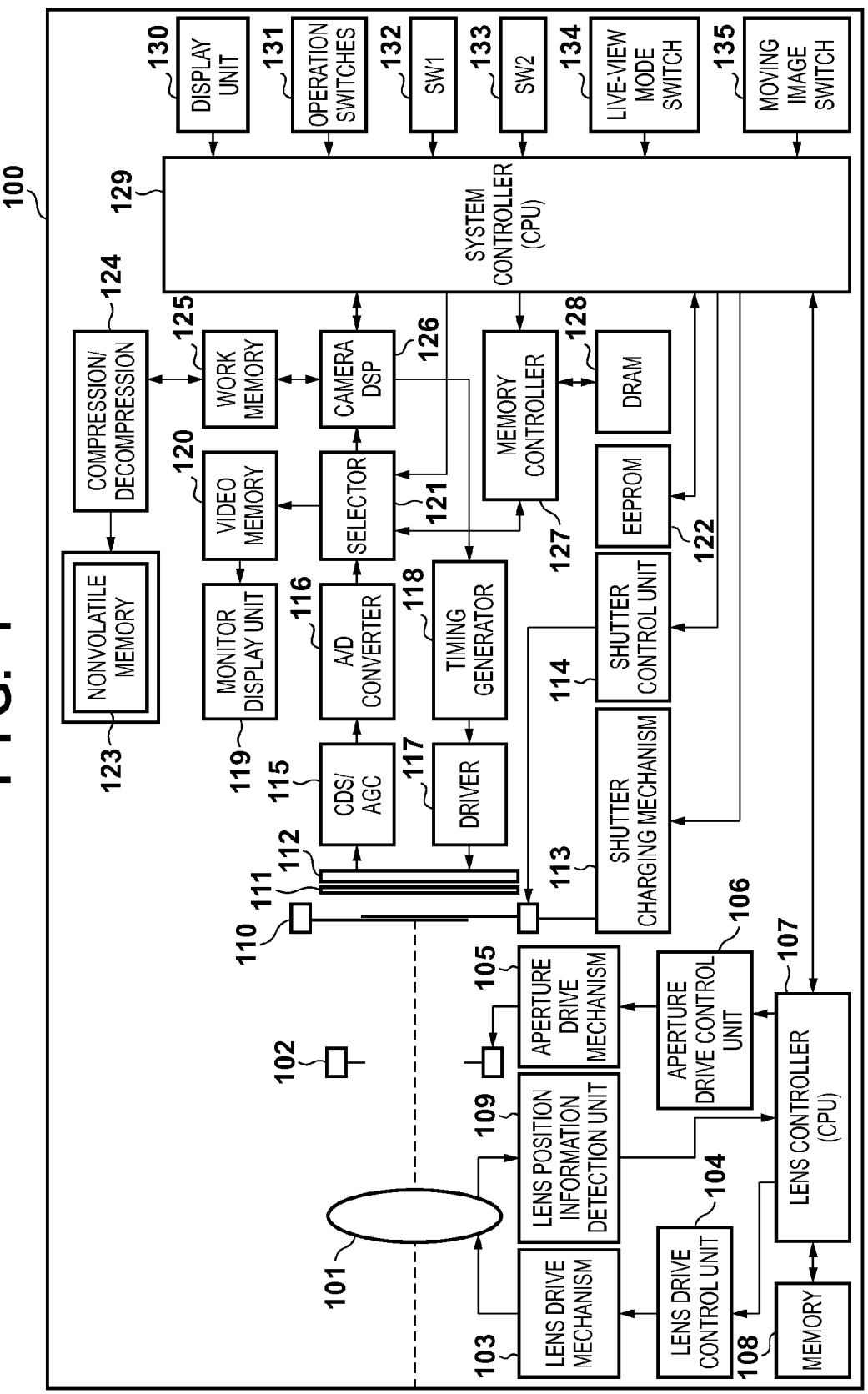
FIG. 1 is a block diagram of an exemplary functional configuration of a digital camera as an example of an image capture apparatus according to an embodiment of the present invention.

FIG. 1 is a block diagram of an exemplary functional configuration of a digital camera as an example of an image capture apparatus according to an embodiment of the invention. Note that the present invention is applicable to arbitrary image capture apparatuses using contrast AF and a plurality of focus detection areas that are each located at a fixed position and each has a fixed size, as well as arbitrary devices using such an image capture apparatus (e.g., mobile phones, personal digital assistants, computer equipment, and the like that are each provided with a camera).

As illustrated in FIG. 1, the digital camera 100 includes a system controller 129 and a lens controller 107, the system controller 129 being configured by a CPU, an MPU, and the like and performing overall control of camera operations, and the lens controller 107 performing overall control of an optical system under the control of the system controller 129. Although FIG. 1 illustrates only a focusing lens 101 that can change an in-focus distance out of lenses constituting the optical system, other lenses (not shown) such as a variable power lens and a fixed lens are additionally provided. In the present embodiment, commands to drive and stop the focusing lens 101, the amount of drive of the focusing lens 101, and the required drive speed of the focusing lens 101 are transmitted from the system controller 129 to the lens controller 107. Also, the amount of drive and the drive speed of an aperture 102 for aperture control and requests to transmit various types of data on the lens side are transmitted from the system controller 129 to the lens controller 107. Note that the optical system (constituent elements 101 to 108) does not necessarily have to be built into the digital camera 100 and may be configured in the form of an interchangeable lens.

When performing an automatic focus detection operation, the system controller 129 issues a lens drive command that instructs the direction, amount, and speed of drive of the focusing lens 101 to the lens controller 107. Upon receiving the lens drive command from the system controller 129, the lens controller 107 controls a lens drive mechanism 103 through a lens drive control unit 104. The lens drive mechanism 103 includes, for example, a stepping motor serving as a driving source and drives the focusing lens 101 along an optical axis.

The amount of movement of the focusing lens 101 is transmitted to the lens controller 107 through a lens position information detection unit 109 that is configured by, for example, a pulse encoder for detecting the amount of rotation of the stepping motor. The output of the lens position information detection unit 109 is connected to a hardware counter (not shown) provided in the lens controller 107. Thus, when the focusing lens 101 is driven and the lens position information detection unit 109 outputs pulses, the number of which corresponds to the amount of drive of the focusing lens 101, the number of pulses is counted by the counter of the lens controller 107. The lens controller 107 is thus capable of accessing the register of the internal hardware counter and reading out the stored counter value as position information regarding the focusing lens 101.

Upon receiving an aperture control command from the system controller 129, the lens controller 107 controls an aperture drive mechanism 105 for driving the aperture 102 through an aperture drive control unit 106 and accordingly controls the aperture 102 in accordance with the amount of drive received in the aperture control command.

The lens controller 107 is connected to a memory 108, at least part of which is a nonvolatile area. The memory 108 stores performance information such as the focal length (angle of view) of the variable power lens (not shown), a minimum F-number of the aperture 102, and settable aperture drive speeds.

Light rays incident through the opening of the aperture 102 pass through the opening of a focal plane shutter 110, which is a mechanical shutter, and an optical filter 111 and reach an image sensor 112. The optical filter 111 has an optical low-pass filter function and an infrared rejection filter function of filtering out infrared rays from the incident light rays and guiding visible light rays to the image sensor 112.

The focal plane shutter 110 is provided with a top curtain and the following curtain that use, for example, a spring as a driving source, and controls exposure and shielding of the image sensor 112. The shutter control unit 114 controls the driving and movement of the top curtain and the following curtain in the focal plane shutter 110 in accordance with a control signal received from the system controller 129. A shutter charging mechanism 113 charges the spring for the following operation after the movement of the focal plane shutter 110.

The system controller 129 stores in, for example, an EEPROM 122 a program diagram that describes the relationship between subject brightness obtained from output from a predetermined photometric region in the image sensor 112, and the charge accumulation time, exposure sensitivity, and aperture value of the image sensor 112.

The timing generator 118 generates a timing signal and determines the drive timing of the overall image capture system. A driver 117 generates a drive signal for driving each pixel in the image sensor 112, based on the timing signal from the timing generator 118. The image sensor 112 converts light rays incident on each pixel during exposure into a charge and generates an electric signal (image signal) on a pixel-by-pixel basis.

The image signals generated by the image sensor 112 are amplified by a correlated double sampling/automatic gain control (CDS/AGC) circuit 115 and converted into digital image signals by an A/D converter 116. The digital image signals output from the A/D converter 116 are input to a selector 121. The selector 121 switches the output destination of the digital image signals among a camera DSP 126, a video memory 120, and a memory controller 127, based on a signal from the system controller 129.

The digital image signals input to the memory controller 127 are all transferred to a DRAM 128, which is a frame memory. By transferring the digital image signals that have been transferred to the DRAM 128 at regular intervals (at a predetermined frame rate) to the video memory 120 via the selector 121, a monitor display unit 119 can function as an electronic viewfinder.

The camera DSP 126 is connected to the timing generator 118 and to the A/D converter 116, the video memory 120, and the work memory 125 via the selector 121, in addition to the system controller 129.

When capturing a recording image, the system controller 129 reads out one frame-worth of digital signals from the DRAM 128, subjects the digital signals to image processing in the camera DSP 126, and temporarily stores the processed signals in the work memory 125. The system controller 129 then causes a compression/decompression circuit 124 to compress the image data stored in the work memory 125 in accordance with a predetermined format such as the JPEG format, and records the compressed image data into an external nonvolatile memory 123. The nonvolatile memory 123 is usually a detachable recording medium such as a semiconductor memory card, a magnetic disk, or an optical disk, and it may also be an arbitrary nonvolatile recording medium. Alternatively, both a detachable recording medium and a non-detachable recording medium may be used in combination.

Operation switches 131, which are connected to the system controller 129 and comprise a group of arbitrary input devices, allow a user to input settings and instructions to the digital camera 100. A display unit 130 is a display device such as a liquid crystal panel, a light emitting diode (LED), or an organic EL panel on which information regarding the operating state of the digital camera 100 is displayed. A SW1 132 and a SW2 133 are two switches that are included in a release switch. Pressing the release button halfway down (first-stage press) turns the SW1 132 on, and pressing the release button all the way down (second-stage press) turns the SW2 133 on.

When the SW1 132 is turned on, the system controller 129 starts a pre-shooting operation including photometric measurements (determination of an exposure condition) and focus detection. When the SW2 133 is turned on, the system controller 129 starts a shooting operation for still-image recording (charge storage and readout operations). A live-view mode switch 134 controls the switching on/off of live-view display in which the monitor display unit 119 functions as an EVF. A moving image switch 135 is a switch for instructing the start of moving image capture. When capturing a moving image, the system controller 129 repeatedly executes charge storage and readout at a predetermined frame rate (e.g., 30 frames per second). Note that the operation performed during moving image capture is basically the same as the shooting operation performed during live-view display.

The digital camera 100 of the present embodiment is initially set at power-on such that still images are recorded (still image mode), and can switch to a setting of recording moving images (moving image mode) through the operation of the moving image switch 135. Operating the moving image switch 135 in the moving image mode causes the digital camera 100 to switch back to the still image mode.

Figure 2:
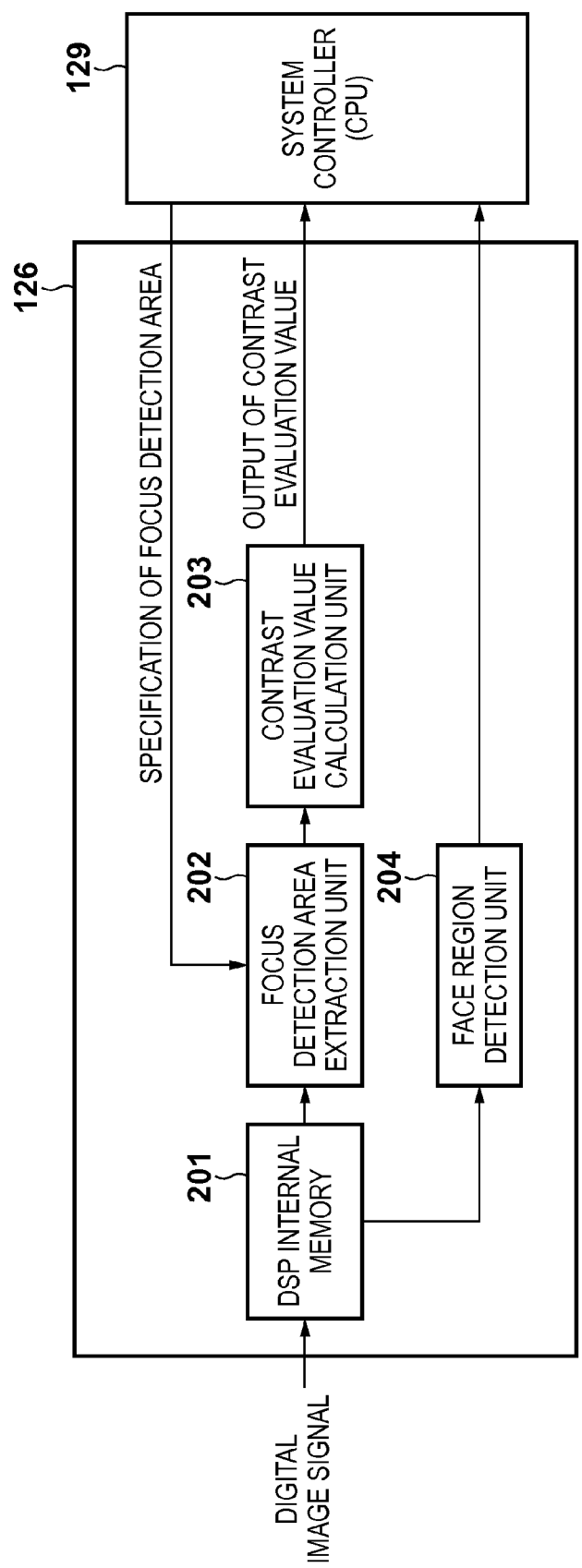
FIG. 2 is a block diagram of an exemplary functional configuration of a camera DSP in FIG. 1.

Next, an exemplary functional configuration and operation of the camera DSP 126 will be described with reference to the block diagram of FIG. 2.

As described above, the image signals read out from the image sensor 112 are amplified by the CDS/AGC circuit 115, converted into digital image signals by the A/D converter 116, and input to the camera DSP 126 via the selector 121.

The camera DSP 126 performs calculation of contrast evaluation values used in contrast AF and detection of a specific subject, using the digital image signals. Here, a person's face is assumed to be a specific subject. Note that the specific subject may be an arbitrary subject that can be detected from an image using a known technique such as pattern matching.

In order to calculate contrast evaluation values, the digital image signals input to the camera DSP 126 are input to a focus detection area extraction unit 202 via a DSP internal memory 201. The focus detection area extraction unit 202 extracts an image in each focus detection area from a full screen-worth of digital image signals and supplies the extracted image to a contrast evaluation value calculation unit 203.

In the digital camera 100 of the present embodiment, a plurality of focus detection areas that are each located at a fixed position and each has a fixed size are preset. The positions and sizes of the focus detection areas are preset in the focus detection area extraction unit 202 by the system controller 129. For each of the focus detection areas, the contrast evaluation value calculation unit 203 extracts a predetermined frequency component through a digital filtering operation performed on the image in the focus detection area, and outputs the frequency component as a contrast evaluation value to the system controller 129. A face region detection unit 204 extracts feature points of a person's face from the full screen-worth of digital image signals that have been input via the DSP internal memory 201, and thereby detects an image region (face region) that is considered to be a person's face. Such a technique for detecting a specific subject such as a person's face from an image is generally used, and in the present embodiment, a face region can be detected using a known technique. The face region detection unit 204 outputs information regarding the detected face region (e.g., position and size) to the system controller 129.

Next, the focus detection areas will be described.

FIG. 3 schematically shows an example of a plurality of focus detection areas used in the digital camera 100 of the present embodiment. In FIG. 3, a full screen (imaging view) 301 includes a person 302, which is a main subject, trees 303 located far back of the main subject, and a hedge 304 located in front of the main subject. Also, 24 focus detection areas 305 in total that are obtained by equally dividing a region on the screen excluding the outer peripheral edge into sixths horizontally and quarters vertically are set as a plurality of focus detection areas. The focus detection areas 305 are each located at a fixed position and each has a fixed size, and focus detection can be performed for each of the focus detection areas. Which focus detection area is ultimately focused on is determined by the system controller 129. In the example of FIG. 3, there is no such a focus detection area that encompasses the entire of each subject such as the person 302, the trees 303, or the hedge 304, and a plurality of focus detection areas include part of one or more subject regions.

Note that in this specification, "including" a subject or a subject region means overlapping a subject region (i.e., including, as at least a part, a subject or a subject region).

When powered on, the digital camera 100 enters a shooting standby state in the still image mode, and the system controller 129 starts a live-view display operation. When the release button is pressed halfway down in the shooting standby state and the SW1 131 is turned on, the system controller 129 executes a focus detection operation on the 24 focus detection areas as part of the pre-shooting operation.

Focus Detection Operation

Figure 4:
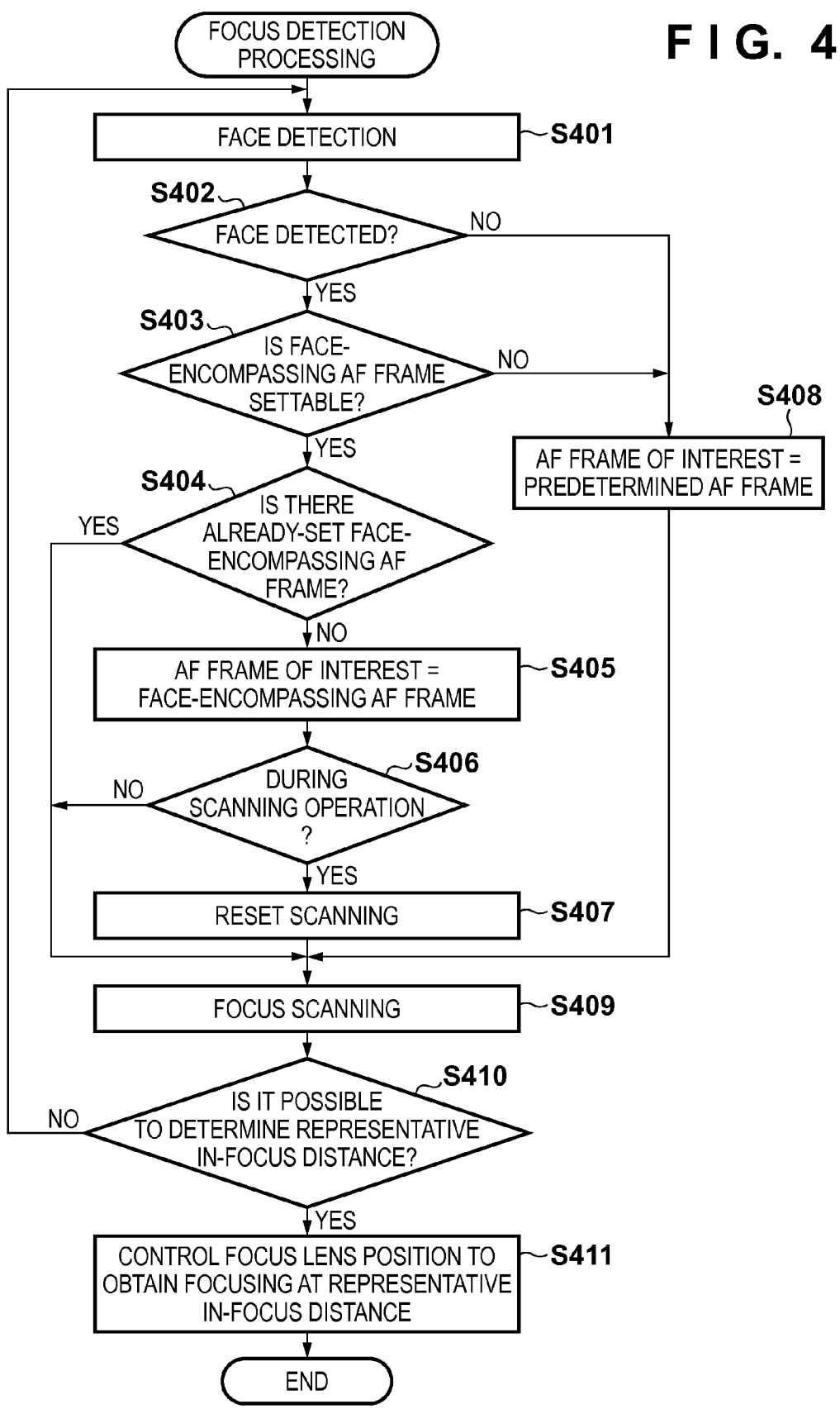
FIG. 4 is a flowchart illustrating a focus detection operation performed by a digital camera according to a first embodiment of the present invention.

Next, the focus detection operation according to the present embodiment will be described with reference to the flowchart of FIG. 4. The following operation is executed under the control of the system controller 129, unless otherwise indicated.

As described above, the focus detection operation is executed as one part of the pre-shooting operation that is started when the SW1 131 is turned on in the shooting standby state in the still image mode. While other operations such as determining the exposure condition are also executed in the pre-shooting operation, such operations are not directly related to the present invention and can be executed by the application of a known technique. Thus, a description thereof has been omitted, and only the focus detection operation that represents a feature of the present invention is described below.

As described above, it is assumed in the shooting standby state that a live-view display operation is being executed at a frame rate of 30 to 60 frames per second and not only shooting and display operations but also any necessary operations for generating display image, such as image processing, are being executed.

In step S401, the face region detection unit 204 applies face-region detection processing to image signals generated for live-view display. Upon receiving, for example, output from the face region detection unit 204, the system controller 129 advances the processing to step S402.

In step S402, the system controller 129 determines whether or not a face region has been detected, based on, for example, the output from the face region detection unit 204. When it has been determined that a face region has been detected, the system controller 129 advances the processing to step S403, and when it has been determined that a face region has not been detected, the system controller 129 advances the processing to step S408.

In step S403, the system controller 129 determines the presence or absence of a focus detection area that is encompassed in the face region (face-encompassing frame), based on the face region detected in step S401 and the positions and sizes of the focus detection areas 305. When it has been determined that a face-encompassing frame is present, the system controller 129 advances the processing to step S404, and when it has been determined that no face-encompassing frame is present, the system controller 129 advances the processing to step S408.

In step S404, the system controller 129 determines whether or not another face-encompassing frame has already been set, and if another face-encompassing frame has already been set, performs control such that focus scanning is continued. Specifically, when another face-encompassing frame has already been set, the system controller 129 advances the processing to step S409, and when another face-encompassing frame has not been set, the system controller 129 advances the processing to step S405.

In step S405, the system controller 129 sets the face-encompassing frame as a focus detection area of interest (AF frame of interest) and advances the processing to step S406. As described previously, if focus detection is performed based on contact evaluation values for focus detection areas that include both the background region and part of the face region, the main subject may become out of focus or may not be properly focused on due to a conflict between far and near subjects. Using a face-encompassing frame can avoid this problem because the face-encompassing frame includes only a face region. Use of the face-encompassing frame that does not include a contour portion can also avoid a problem that in a focus detection area that includes a contour portion of a face, the contour portion is focused on due to an increase in the contrast on the contour portion in a backlight scene or the like.

In step S406, the system controller 129 determines whether or not a scanning operation of driving the focusing lens 101 step by step by a predetermined amount is being executed in order to search for a focus lens position at which the contrast evaluation value is the highest. When it has been determined that the scanning operation is being executed, the system controller 129 advances the processing to step S407, and when it has been determined that the scanning operation is not being executed, the system controller 129 advances the processing to step S409.

In step S407, the system controller 129 resets the results of scanning that has been executed so far, makes scan settings based on the newly set AF frame of interest, and then advances the processing to step S409.

In step S408, the system controller 129 sets all of the focus detection areas or some specific focus detection areas (so-called zone AF frame) among the 24 focus detection areas as AF frames of interest, and advances the processing to step S409.

In step S409, the system controller 129 performs a scanning operation on each AF frame of interest that has been set, detects an in-focus position for each AF frame of interest, and advances the processing to step S410.

Specifically, the system controller 129 sequentially issues a lens drive command to the lens controller 107 so as to perform shooting while sequentially moving the focusing lens 101 by a predetermined amount within a predetermined scanning range. The system controller 129 then stores the contrast evaluation value obtained by the contrast evaluation value calculation unit 203 in, for example, the DRAM 128 for each AF frame of interest in an image obtained at each individual focusing lens position. After the focusing lens 101 has moved to the end of the scanning range, the system controller 129 detects a focusing lens position at which the contrast evaluation value is the highest, for each AF frame of interest.

In step S410, the system controller 129 determines whether or not it is possible to determine a representative in-focus distance in accordance with a predetermined condition (e.g., higher priority is given to a shorter in-focus distance), based on the focus detection result (in-focus distance) for each AF frame of interest. Note that if only a single AF frame of interest is present, the in-focus distance detected for that AF frame of interest is determined to be a representative in-focus distance. When it has been determined that it is possible to determine a representative in-focus distance, the system controller 129 advances the processing to step S411, and when it has been determined that it is not possible to determine a representative in-focus distance, the system controller 129 returns the processing to step S401 and repeats the processing from face detection again.

In step S411, the system controller 129 issues a command to move the focusing lens 101 to the position corresponding to the determined representative in-focus distance to the lens controller 107, provides a display indicating an in-focus state on the display unit 130, and ends the focus detection operation.

In this way, in the present embodiment, when a focus detection area that is encompassed in a specific subject region is present, a representative in-focus distance is determined based on the in-focus distance detected for that focus detection area encompassed in the specific subject region. This allows the image capture apparatus using contrast AF and a plurality of focus detection areas that are each located at a fixed position and each has a fixed size to perform focus control on a desired subject while avoiding a problem of a conflict between far and near subjects.

In addition, when a focus detection area that is encompassed in a specific subject region is present, the amount of time required for focus detection can be reduced because focus detection is not performed on the other focus detection areas.

Variation 1 on First Embodiment

In the present embodiment, only in the case where a face-encompassing frame can be set, the face-encompassing frame is set as an AF frame of interest and multi-point focus detection is performed while giving attention to only a face region, but the present embodiment is not limited to this. In the case where the face size is small and a face-encompassing frame cannot be set, multi-point focus detection areas that include the center of a face may be set as AF frames of interest and an operation may be performed so as to eliminate the influence of the other focus detection areas. Such a configuration enables focus detection to be performed while giving as much attention as possible to the face, even if the face size is small and a face-encompassing frame cannot be set.

Variation 2 on First Embodiment

In the present embodiment, when a focus detection area that is encompassed in a specific subject region is present, focus detection is performed on only that focus detection area. Alternatively, it is also possible to detect a focus detection area that is encompassed in a region of another subject that is considered to be located at the same distance as a specific subject and to perform focus detection on that focus detection area.

For example, when the specific subject is a person's face as in the case of FIG. 3, a body portion that is continuous with the person's face is also located at substantially the same distance as the face. In view of this, focus detection may also be performed on a focus detection area that is encompassed in a body region (body-encompassing area). In FIG. 3, a focus detection area 306 is a body-encompassing frame. In the case where a person's face and body are both included in the screen, the body region is often greater than the face region. There is thus a possibility that a body-encompassing frame may exist even if no face-encompassing frame is present, and the face may be properly focused on by performing focus detection on the body-encompassing frame. Furthermore, performing focus detection on both a face-encompassing frame and a body-encompassing frame can increase accuracy in selecting a focus detection area.

Figure 5:
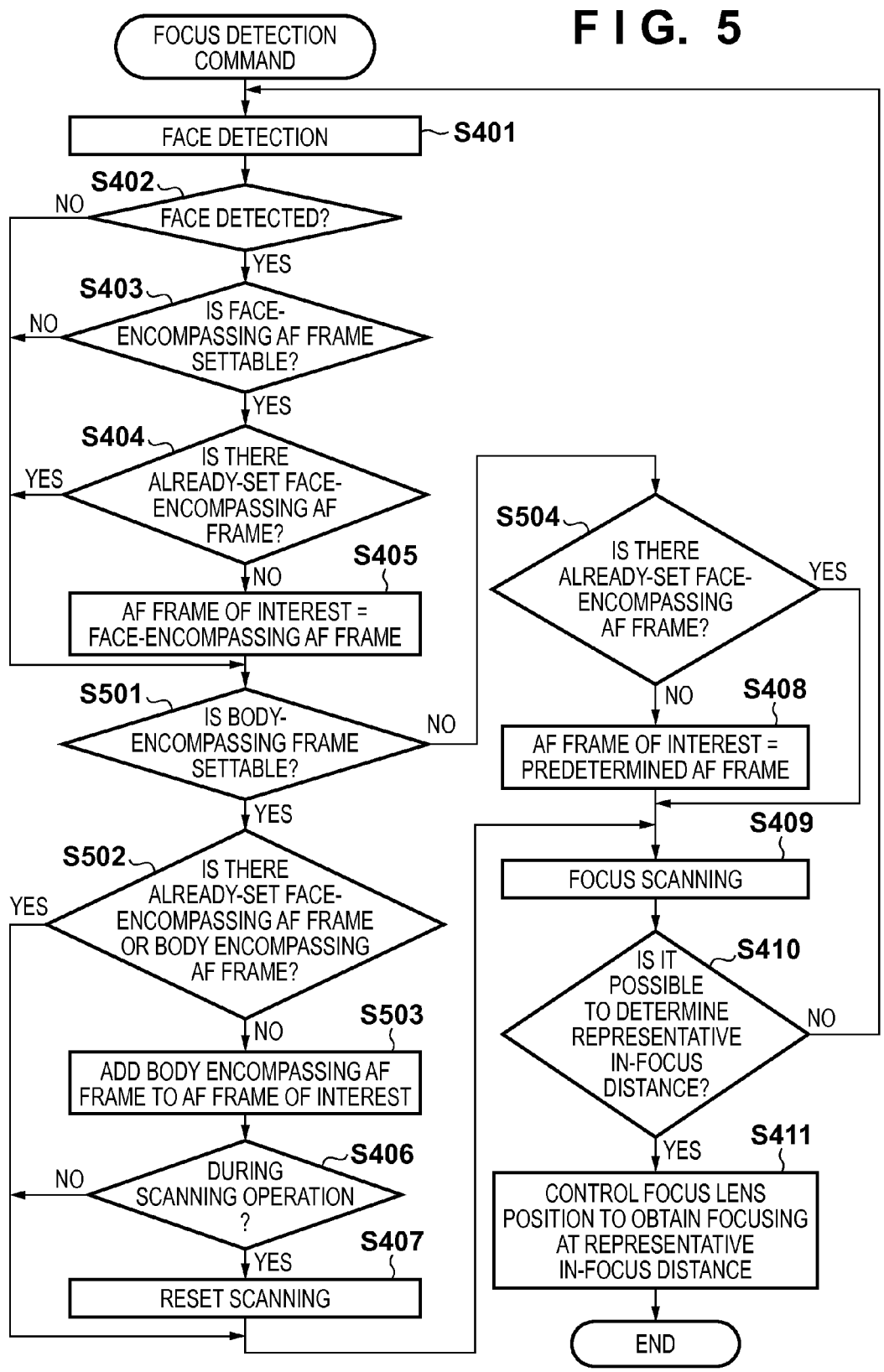
FIG. 5 is a flowchart illustrating a focus detection operation according to a variation on the first embodiment of the present invention.

FIG. 5 is a flowchart illustrating a focus detection operation according to this variation. Steps that are similar to those in FIG. 4 are denoted by the same reference numerals, and redundant descriptions have been omitted. FIG. 5 differs from FIG. 4 in that steps S501 to S504 are added and a body-encompassing frame is also targeted for focus detection in addition to a face-encompassing frame.

In step S501, the system controller 129 determines the presence or absence of a body-encompassing frame. First, the system controller 129 estimates a body region from the position of a face region based on the result of face detection and detects a focus detection frame that is encompassed in the body region (body-encompassing frame). When a body-encompassing frame has been detected, the system controller 129 determines in step S502 whether or not either a face-encompassing frame or a body-encompassing frame has already been set, and when either of them has already been set, performs control such that focus scanning is continued. Specifically, when either a face-encompassing frame or a body-encompassing frame has already been set, the system controller 129 advances the processing to step S409, and when neither of them has been set, the system controller 129 advances the processing to step S503.

In step S503, the system controller 129 adds the body-encompassing frame as a target on which focus detection is performed.

When a body-encompassing frame has not been detected in step S501, the system controller 129 determines in step S504 whether or not a face-encompassing frame has already been set. When a face-encompassing frame has already been set, the system controller 129 advances the processing to step S409, and when a face-encompassing frame has not been set, the system controller 129 advances the processing to step S408.

In the case where both a body-encompassing frame and a face-encompassing frame exist, the system controller 129 may determine the representative in-focus position by giving priority to the result of focus detection performed on the face-encompassing frame.

Second Embodiment

Figure 6:
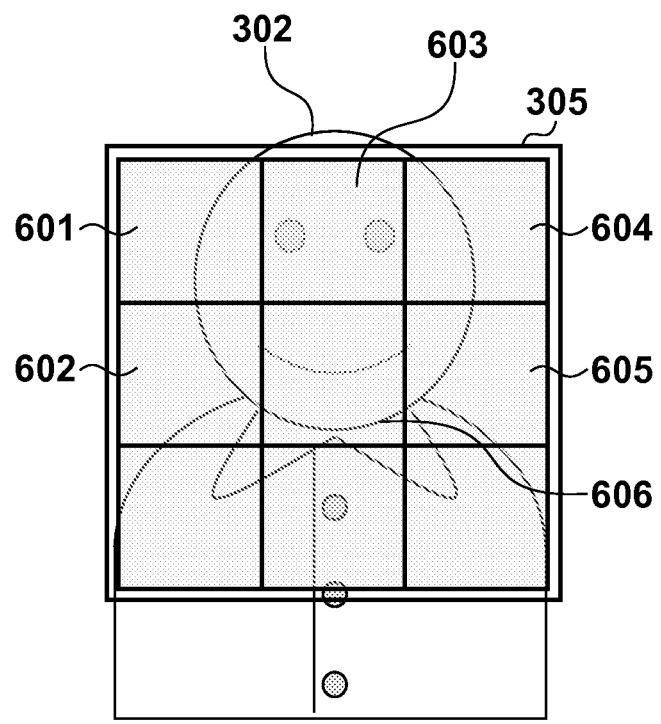
FIG. 6 is a schematic enlarged view of a face portion in FIG. 3.

FIG. 6 is an enlarged view of a region around the person extracted from FIG. 3 and is used to describe an in-focus display method using the face as a specific subject. FIG. 6 illustrates focus detection areas 601 to 606 that include the face region out of the focus detection areas 305. Among these focus detection areas 601 to 606, the focus detection area 603 does not include the contour of the face and includes the center part of the face such as the eyes, whereas the other focus detection areas include the contours of the face.

In the case where the positional relationship between the focus detection areas, each located at a fixed position and having a fixed size, and the person regarded as the specific subject are as illustrated in FIG. 6, a focus is easy to detect in the focus detection areas 601, 602, 604, and 605 that include the contour of the face. For the focus detection area 606, a focus is still easy to detect although whether it is easy or not depends on the contrast on the boundary portion between the face region and the body region. On the contrary, for the focus detection area 603 with no contour, it is often the case that only eyes or eyebrows include contrast components. Furthermore, the contrast in the focus detection area 603 (and 606) may become lower if the face region is underexposed as in the case of a backlit scene or if the face region is overexposed, as in the case where direct sunlight is reflected off the face. On the other hand, this makes it easier to detect a focus in the focus detection areas 601, 602, 604, and 605 that include the contour of the face and the background.

Thus, a situation may arise in which when a display (in-focus display) is provided to indicate a focus detection area for which a focus has successfully been detected, an in-focus display is provided for the focus detection areas 601, 602, 604, and 605 but an in-focus display is not provided for the focus detection areas 603 and 606.

Focus Detection Operation

Next, a focus detection operation according to the present embodiment will be described with reference to the flowchart of FIG. 7. The following operation is executed under the control of the system controller 129, unless otherwise indicated.

As described above, the focus detection operation is executed as one part of the pre-shooting operation that is started when the SW1 131 is turned on in the shooting standby state in the still image mode. While other operations such as determining the exposure condition are also executed in the pre-shooting operation, such operations are not directly related to the present invention and can be executed by the application of a known technique. Thus, a description thereof has been omitted, and only the focus detection operation that represents a feature of the present invention is described below.

As described above, it is assumed in the shooting standby state that a live-view display operation is being executed at a frame rate of 30 to 60 frames per second and not only shooting and display operations but also any necessary operations for generating display image, such as image processing, are being executed.

First, in step S701, the system controller 129 performs known focus detection (focus scanning) that is based on contrast evaluation values, on preset focus detection areas (AF frames of interest) targeted for focus detection. The system controller 129 performs focus detection on each of the AF frames of interest to detect an in-focus distance (position of the focusing lens 101 in an in-focus state). Here, assuming that the preset AF frames of interest are either all of the focus detection areas or a plurality of specific focus detection areas (so-called zone AF frames) among the 24 focus detection areas. After the in-focus distances have been detected for the AF frames of interest, the system controller 129 advances the processing to step S702.

In step S702, the system controller 129 determines whether or not it is possible to determine a representative in-focus distance from the in-focus distances detected for the AF frames of interest in accordance with a predetermined condition (e.g., higher priority is given to a shorter in-focus distance). Note that in case where a single AF frame of interest has been preset, the in-focus distance detected for that single AF frame of interest is determined as the representative in-focus distance. When it has been determined that it is possible to determine a representative in-focus distance, the system controller 129 advances the processing to step S703, and when it has been determined that it is not possible to determine a representative in-focus distance, the system controller 129 returns the processing to step S701 and repeats the processing from focus scanning again.

In step S703, the system controller 129 issues a command to move the focusing lens 101 to a position corresponding to the determined representative in-focus distance to the lens controller 107, provides a display indicating an in-focus state on the display unit 130, and advances the processing to step S704.

In step S704, the system controller 129 detects whether or not any other focus detection area whose in-focus distance is within the depth of field of the representative in-focus distance is present, and stores the detection result. The system controller 129 then advances the processing to step S705.

In step S705, the face region detection unit 204 applies face-region detection processing to the image signals generated for live-view display. Upon receiving, for example, output from the face region detection unit 204, the system controller 129 advances the processing to step S706.

In step S706, the system controller 129 determines whether or not a face region has been detected, based on, for example, the output from the face region detection unit 204. When it has been determined that a face region has been detected, the system controller 129 advances the processing to step S707, and when it has been determined that a face region has not been detected, the system controller 129 advances the processing to step S709.

In step S707, the system controller 129 determines whether or not any of the focus detection area from which the representative in-focus distance determined in step S702 has been detected and at least one other focus detection area detected in step S704 overlaps the face region (includes the face region). When it has been determined that at least one of the focus detection areas that are in focus includes the face region, the system controller 129 advances the processing to step S708, and when it has been determined that none of the focus detection areas that are in focus includes the face region, the system controller 129 advances the processing to step S709.

In step S708, the system controller 129 determines that the face region is included within the depth of field, provides an in-focus display indicating that all of the focus detection areas that include the face region are in focus, and ends the focus detection processing.

In step S709, the system controller 129 provides an in-focus display indicating that the focus detection area from which the representative in-focus distance has been detected and any other focus detection area whose in-focus distance is within the depth of field are in focus, and ends the focus detection processing.

Although there are no particular limitations on the method for providing an in-focus display as long as the user can ascertain focus detection areas that are in focus, one conceivable example is that indicators such as marks or frames that represent focus detection areas that are in focus are superimposed on a live-view image displayed in a monitor display unit. This in-focus display can be realized by the system controller 129 reading out GUI data regarding indicators from, for example, the EEPROM 122 and writing the GUI data into the video memory 120 via the selector 121.

In this way, the present embodiment provides an in-focus display indicating that all focus detection areas that include a specific subject region are in focus, when at least one focus detection area that includes the specific subject region has an in-focus distance that is within the depth of field. Thus, it is possible to inform the user of the fact that all focus detection areas that include a face region are in focus, even in the case where a focus has successfully been detected in those focus detection areas that include the contour portion of the face, whereas focus detection has failed in those focus detection areas that do not include the contour portion of the face.

Variation on Second Embodiment

In the present embodiment, the presence or absence of a focus detection area that includes a face region, which is the specific subject region, is determined in step S707. Alternatively, if a focus detection area that includes a region of another subject considered to be located at the same distance as the specific subject is present, it is possible to provide an in-focus display indicating that all focus detection areas that include a specific subject region are in focus.

For example, in the case where a person's face is assumed to be a specific subject as in FIG. 3, a body portion of the person that is continuous with the face is also at substantially the same distance as the face. Thus, if there is at least one focus detection area that includes the body portion and whose detected in-focus distance is within the depth of field, it may be determined that the face region is also within the depth of field and an in-focus display may be provided to indicate that all focus detection areas that includes the face region are in focus. By performing the operation in this way, it is possible to simply provide a display indicating that the face is substantially in focus after the body region has been focused on, even in the case where focus detection has failed in the center portion of the face such as the eyes or eyebrows.

In this case, in step S707, the system controller 129 estimates a body region from the position of the face region acquired from the result of face detection and also detects the presence or absence of a focus detection area whose detected in-focus distance is within the depth of field and that overlaps the body region. If a focus detection area whose detected in-focus distance is within the depth of field and that overlaps the face region and/or the body region is present, in step S708 the system controller 129 provides an in-focus display indicating that all focus detection areas that overlap the face region are in focus. Note that if a focus detection area whose detected in-focus distance is within the depth of field and that overlaps the body region is present, an in-focus display indicating that this focus detection area is in focus is also provided.

Third Embodiment

Figure 8A:
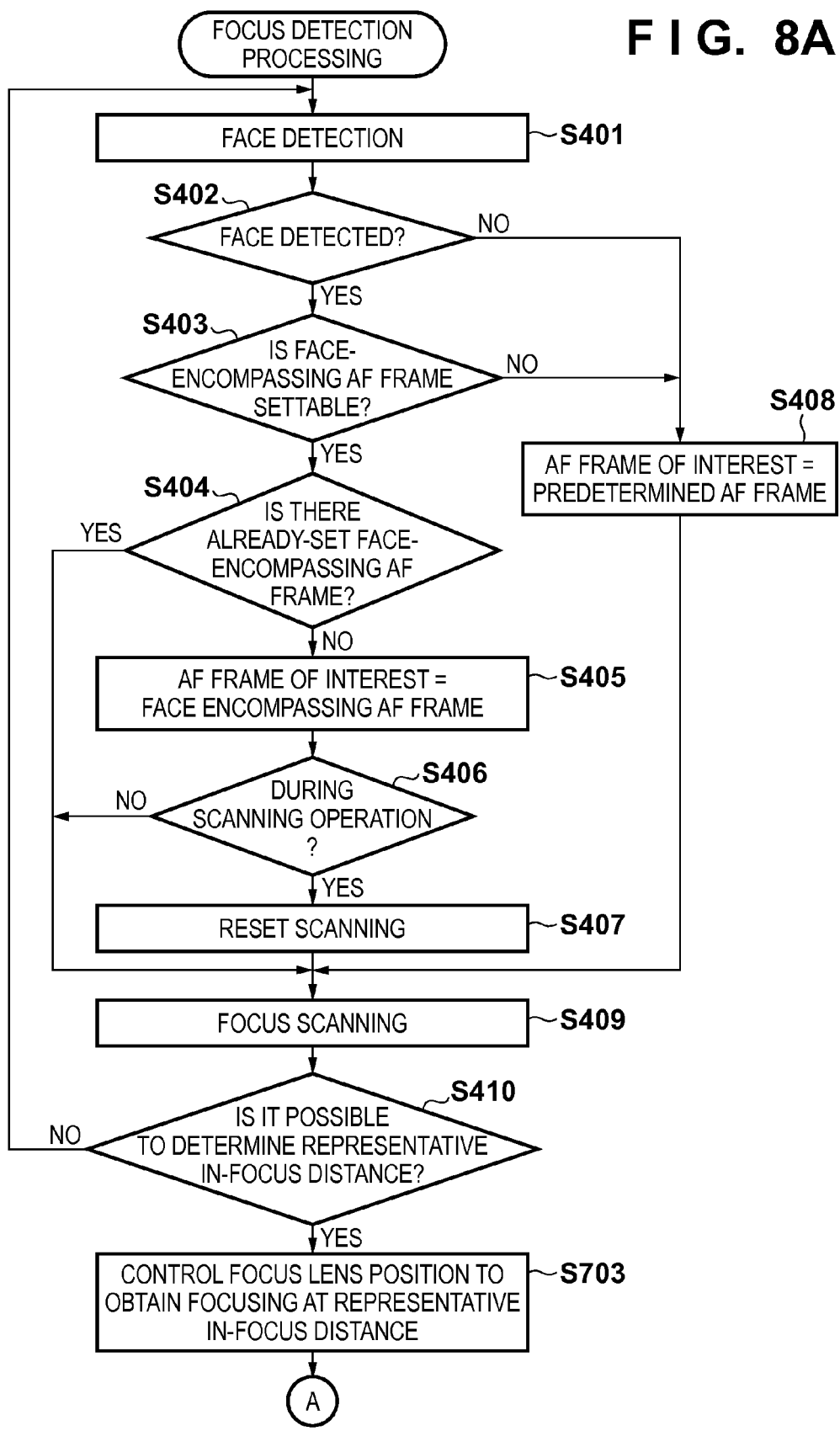
FIGS. 8A and 8B are flowcharts illustrating a focus detection operation performed by a digital camera according to a third embodiment of the present invention.
Figure 8B:
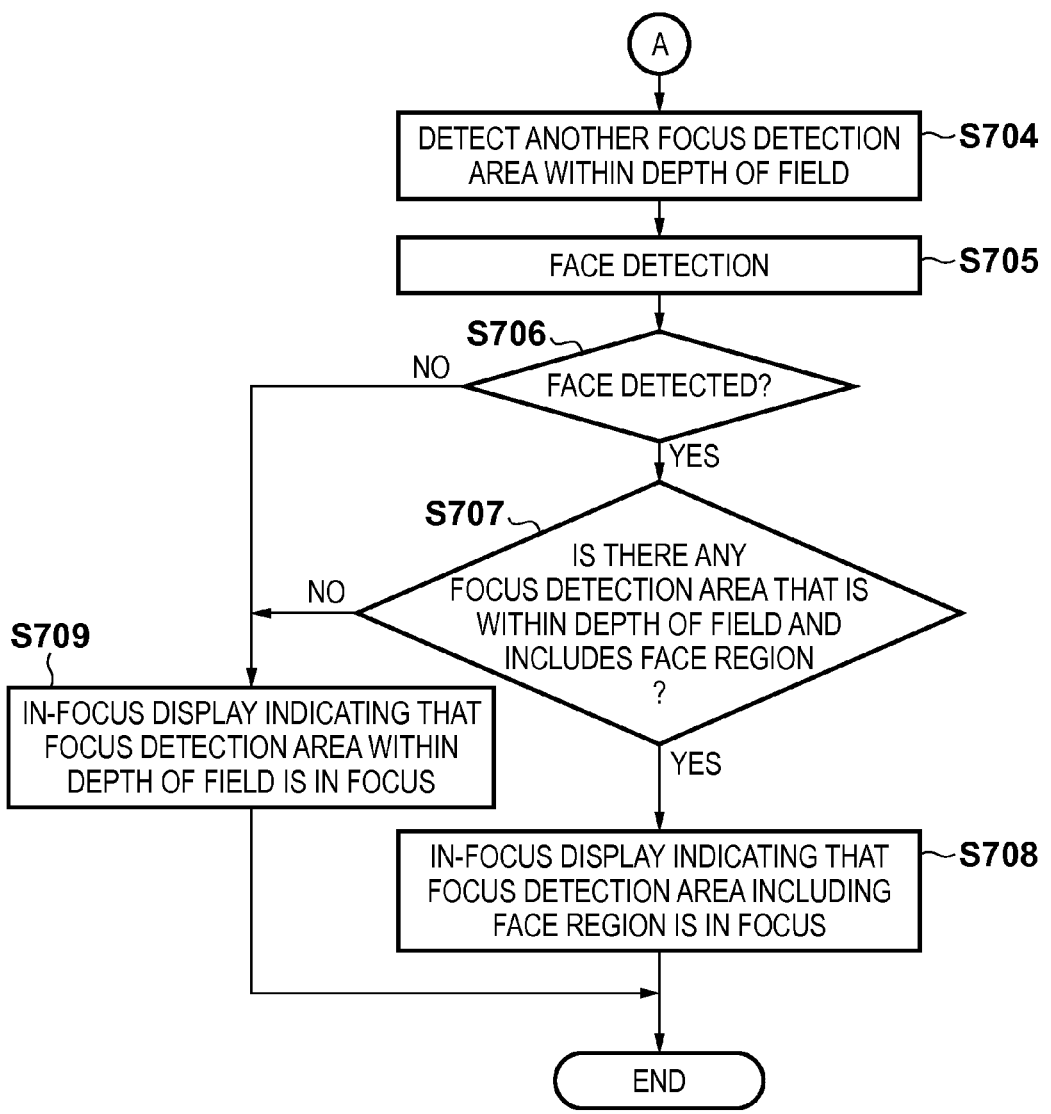

It is possible to combine the first embodiment and the second embodiment, and a focus detection operation performed in this case is illustrated in the flowchart of FIGS. 8A and 8B. In FIGS. 8A and 8B, the processing from steps S401 to S410 is the same as that described in the first embodiment with reference to FIG. 4, and the processing from steps S703 to S709 is the same as that described in the second embodiment with reference to FIG. 7.

In this way, in the present embodiment, when a focus detection area that is encompassed in a specific subject region is present, a representative in-focus distance is determined based on the in-focus distance detected for that focus detection areas encompassed in the specific subject region. This allows the image capture apparatus using contrast AF and a plurality of focus detection areas, each located at a fixed position and having a fixed size, to perform focus control on a desired subject while avoiding a problem of a conflict between far and near subjects.

In addition, the amount of time required for focus detection can be reduced because when a focus detection area that is encompassed in a specific subject region is present, focus detection is not performed on the other focus detection areas.

Moreover, when at least one focus detection area that includes a specific subject region has an in-focus distance that is within the depth of field, an in-focus display is provided to indicate that all focus detection areas that include the specific subject region are in focus. It is thus possible to inform the user of the fact that all focus detection areas that include a face region are in focus, even in the case where a focus has successfully been detected in focus detection areas that include the contour portion of the face but focus detection has failed in focus detection areas that do not include the contour portion of the face.

Variation 1 on Third Embodiment

In the present embodiment, only in the case where a face-encompassing frame can be set, the face-encompassing frame is set as an AF frame of interest and multi-point focus detection is performed while giving attention to only a face region, but the present embodiment is not limited to this, like variation 1 on the first embodiment. In the case where the face size is small and a face-encompassing frame cannot be set, multi-point focus detection areas that include the center of a face may be set as AF frames of interest and an operation may be performed so as to eliminate the influence of the other focus detection areas. Such a configuration enables focus detection to be performed while giving as much attention as possible to the face, even if the face size is small and a face-encompassing frame cannot be set.

Variation 2 on Third Embodiment

Figure 9:
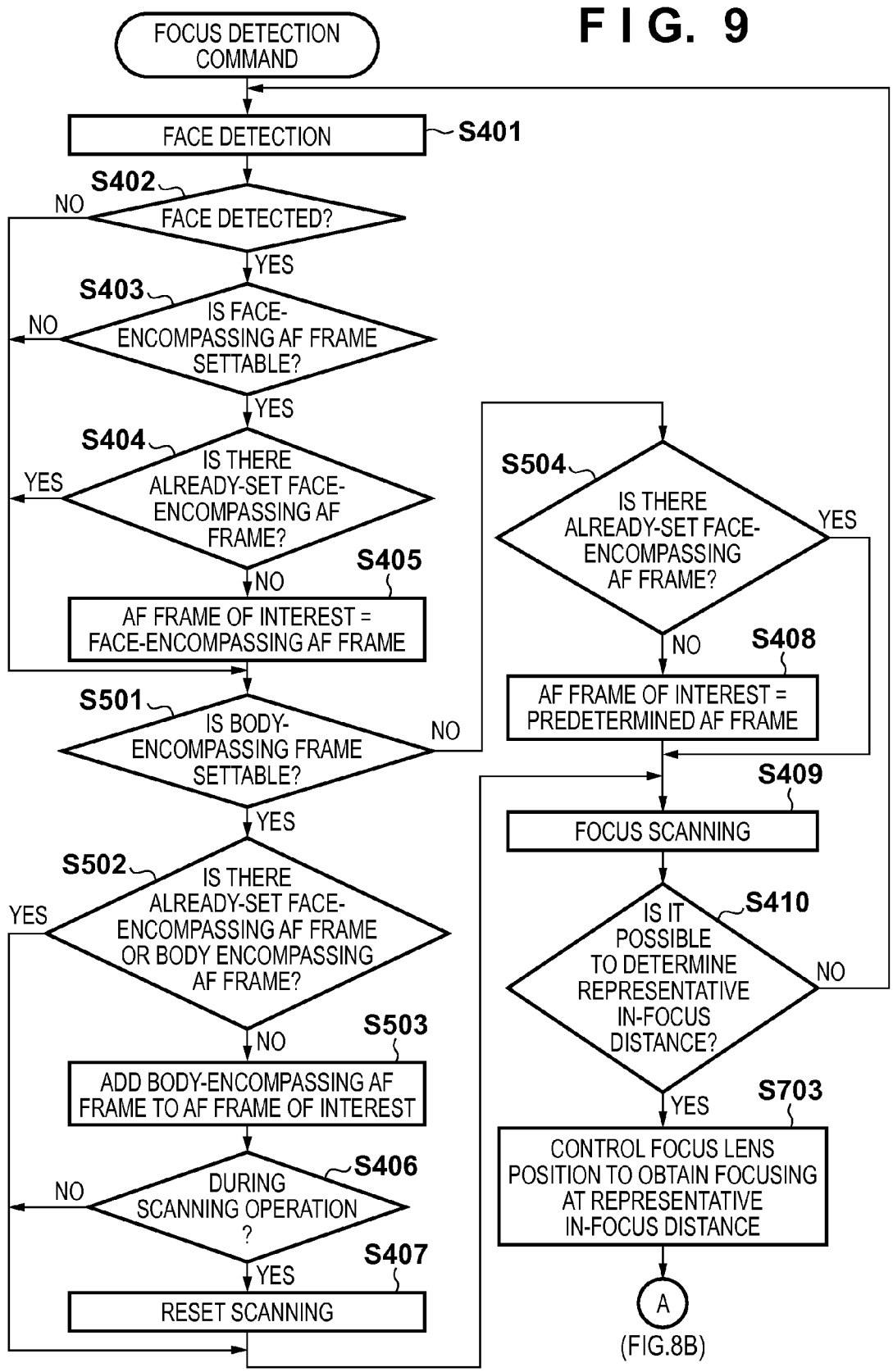
FIG. 9 is a flowchart illustrating a focus detection operation according to a variation on the third embodiment of the present invention.

Also in the present embodiment, it is possible to detect a focus detection area that is encompassed in a region of another subject that is considered to be located at the same distance as the specific subject and to perform focus detection on such a focus detection area. Like variation 2 on the first embodiment, FIG. 9 is a flowchart of a focus detection operation performed when focus detection is also performed on a focus detection area that is encompassed in a body region (body-encompassing frame). In FIG. 9, steps that are similar to those in FIGS. 6 and 8A are denoted by the same reference numerals, and redundant descriptions have been omitted.

Other Embodiments

The above embodiments describe a method for setting focus detection areas during a scanning operation and an in-focus display method when contrast AF is performed within a predetermined scanning range. The present invention, however, can also be applied to settings regarding focus detection areas and in-focus display in the case of so-called hill-climbing AF in which the focus is adjusted by moving the focus lens based on the comparison of evaluation values acquired at a plurality of focus lens positions. Similarly, the present invention is also applicable to settings regarding focus detection areas and in-focus display in the case of a phase-contrast AF system.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications Nos. 2012-114992, 2012-114993, and 2012-114994, all filed on May 18, 2012, which are hereby incorporated by reference herein their entirety.

What is claimed is:

1. An image capture apparatus comprising:
a focus detection unit configured to perform focus detection based on a contrast evaluation value for an image included in a focus detection area;
a subject detection unit configured to detect a region of a specific subject from an image; and
a selection unit configured to select at least one focus detection area, on which focus detection is performed by the focus detection unit, from among a plurality of preset focus detection areas each being located at a fixed position and having a fixed size,
wherein the selection unit is configured to, when the region of the specific subject is detected and a focus detection area that is encompassed by the region of the specific subject is present among the plurality of preset focus detection areas, select the focus detection area that is encompassed by the region of the specific subject, and when the region of the specific subject is detected and no focus detection area that is encompassed by the region of the specific subject is present among the plurality of preset focus detection areas, select at least one predetermined focus detection area from among the plurality of preset focus detection areas.

2. The image capture apparatus according to claim 1, wherein
the subject detection unit is configured to further detect a region of another subject that is considered to be located at the same distance as the specific subject, and
the selection unit is configured to, when the region of the other subject is detected and a focus detection area that is encompassed by the region of the other subject is present among the plurality of preset focus detection areas, further select the focus detection area that is encompassed by the region of the other subject, and when the region of the other subject is detected and neither a focus detection area that is encompassed by the region of the specific subject nor a focus detection area that is encompassed by the region of the other subject is present among the plurality of preset focus detection areas, select at least one predetermined focus detection area from among the plurality of preset focus detection areas.

3. The image capture apparatus according to claim 2, wherein the subject detection unit is configured to detect a face of a person as the specific subject and a body of the person as the other subject.

4. The image capture apparatus according to claim 1, further comprising a determination unit configured to determine one of the at least one focus detection area selected by the selection unit as a focus detection area that is focused on, based on a focus detection result for the at least one focus detection area.

5. The image capture apparatus according to claim 1, wherein the focus detection unit is configured to, when a focus detection area that is encompassed by the region of the specific subject is not yet set and a focus detection area that is encompassed by the region of the specific subject is present among the plurality of preset focus detection areas, reset a result of focus detection that has been performed without any focus detection area that is encompassed by the region of the specific subject being set, and perform focus detection based on a contrast evaluation value for an image included in the focus detection area that is encompassed by the region of the specific subject and that is selected by the selection unit.

6. A method for controlling an image capture apparatus, comprising:
a subject detection step of detecting a region of a specific subject from an image;
a selection step of selecting a focus detection area on which focus detection is performed, from among a plurality of preset focus detection areas each being located at a fixed position and having a fixed size; and
a focus detection step of performing focus detection based on a contrast evaluation value for an image included in the focus detection area selected in the selection step,
wherein in the selection step, when the region of the specific subject is detected in the subject detection step and a focus detection area that is encompassed by the region of the specific subject is present among the plurality of preset focus detection areas, the focus detection area that is encompassed by the region of the specific subject is selected, and when the region of the specific subject is detected in the subject detection step and no focus detection area that is encompassed by the region of the specific subject is present among the plurality of preset focus detection area, at least one predetermined focus detection area is selected from among the plurality of preset focus detection areas.

7. An image capture apparatus comprising:
a focus detection unit configured to set a plurality of focus detection areas each being located at a fixed position and having a fixed size, and for the focus detection areas, detect an in-focus distance based on a contrast evaluation value for an image;
a subject detection unit configured to detect a region of a specific subject from an image;
a determination unit configured to determine a representative in-focus distance based on the in-focus distances detected by the focus detection unit; and
an in-focus display unit configured to, when at least one of the in-focus distances, detected for focus detection areas that include the region of the specific subject, is within a depth of field of the representative in-focus distance, provide a display indicating that all of the focus detection areas that include the region of the specific subject are in focus, even if any of the focus detection areas that include the region of the specific subject has an in-focus distance not within the depth of field of the representative in-focus distance.

8. The image capture apparatus according to claim 7, wherein
the subject detection unit is configured to further detect a region of another subject that is considered to be located at the same distance as the specific subject, and
the in-focus display unit is configured to, when at least one of the in-focus distances, detected for focus detection areas that include the region of the other subject, is within a depth of field of the representative in-focus distance, provide a display indicating that all of the focus detection areas that include the region of the specific subject are in focus, even if none of the focus detection areas that include the region of the specific subject has an in-focus distance within the depth of field of the representative in-focus distance.

9. The image capture apparatus according to claim 8, wherein the subject detection unit is configured to detect a face of a person as the specific subject and a body of the person as the other subject.

10. A method for controlling an image capture apparatus, comprising:
a focus detection step of setting a plurality of focus detection areas each being located at a fixed position and having a fixed size, and for the focus detection areas, detecting an in-focus distance based on a contrast evaluation value for an image;
a subject detection step of detecting a region of a specific subject from an image;
a determination step of determining a representative in-focus distance based on the in-focus distances detected in the focus detection step; and
an in-focus display step of, when at least one of the in-focus distances, detected for focus detection areas that include the region of the specific subject, is within a depth of field of the representative in-focus distance, providing a display indicating that all of the focus detection areas that include the region of the specific subject are in focus, even if any of the focus detection areas that include the region of the specific subject has an in-focus distance not within the depth of field of the representative in-focus distance.

11. An image capture apparatus comprising:
a focus detection unit configured to detect an in-focus distance of a focus detection area based on a contrast evaluation value for an image included in the focus detection area;
a subject detection unit configured to detect a region of a specific subject from an image;
a selection unit configured to select a focus detection area, for which an in-focus distance is detected by the focus detection unit, from among a plurality of preset focus detection areas each being located at a fixed position and having a fixed size;
a determination unit configured to determine a representative in-focus distance based on an in-focus distance detected by the focus detection unit; and
an in-focus display unit configured to provide a display indicating that a focus detection area whose in-focus distance detected by the focus detection unit is within a depth of field of the representative in-focus distance is in focus among the plurality of preset focus detection areas,
wherein the selection unit is configured to, when the region of the specific subject is detected and a focus detection area that is encompassed by the region of the specific subject is present among the plurality of preset focus detection areas, select the focus detection area that is encompassed by the region of the specific subject, and when no focus detection area that is encompassed by the region of the specific subject is present among the plurality of preset focus detection areas, select at least one predetermined focus detection area from among the plurality of preset focus detection areas, and
the in-focus display unit is configured to, when a focus detection area that includes the region of the specific subject is present among a focus detection area whose in-focus distance detected by the focus detection unit is within a depth of field of the representative in-focus distance, provide a display indicating that every focus detection area that includes the region of the specific subject is in focus among the plurality of preset focus detection areas.

12. The image capture apparatus according to claim 11, wherein
the subject detection unit is configured to further detect a region of another subject that is considered to be located at the same distance as the specific subject, and
the selection unit is configured to, when the region of the other subject is detected and a focus detection area that is encompassed by the region of the other subject is present among the plurality of preset focus detection areas, further select the focus detection area that is encompassed by the region of the other subject, and when the region of the other subject is detected and neither a focus detection area that is encompassed by the region of the specific subject nor a focus detection area that is encompassed by the region of the other subject is present among the plurality of preset focus detection areas, select at least one predetermined focus detection area from among the plurality of preset focus detection areas.

13. The image capture apparatus according to claim 11, wherein
the subject detection unit is configured to further detect a region of another subject that is considered to be located at the same distance as the specific subject, and
the in-focus display unit is configured to, when a focus detection area that includes the region of the other subject is present among a focus detection area whose in-focus distance detected by the focus detection unit is within a depth of field of the representative in-focus distance, provide a display indicating that every focus detection area that includes the region of the specific subject is in focus among the plurality of preset focus detection areas, even if no focus detection area that includes the region of the specific subject is present among the focus detection area whose in-focus distance detected by the focus detection unit is within a depth of field of the representative in-focus distance.

14. The image capture apparatus according to claim 12, wherein the subject detection unit is configured to detect a face of a person as the specific subject and a body of the person as the other subject.

15. A method for controlling an image capture apparatus, comprising:
   a subject detection step of detecting a region of a specific subject from an image;
   a selection step of selecting a focus detection area for which an in-focus distance is detected, from among a plurality of preset focus detection areas each being located at a fixed distance and having a fixed size;
   a focus detection step of detecting an in-focus distance of the focus detection area selected in the selection step, based on a contrast evaluation value for an image included in the focus detection area;
   a determination step of determining a representative in-focus distance based on the in-focus distance detected in the focus detection step; and
   an in-focus display step of providing a display indicating that a focus detection area whose in-focus distance detected in the focus detection step is within a depth of field of the representative in-focus distance is in focus among the plurality of preset focus detection areas,
   wherein in the selection step, when the region of the specific subject is detected and a focus detection area that is encompassed by the region of the specific subject is present among the plurality of preset focus detection areas, the focus detection area that is encompassed by the region of the specific subject is selected, and when the region of the specific subject is detected and no focus detection area that is encompassed by the region of the specific subject is present among the plurality of preset focus detection areas, at least one predetermined focus detection area is selected from among the plurality of preset focus detection areas, and
   in the in-focus display step, when a focus detection area that includes the region of the specific subject is present among a focus detection area whose in-focus distance detected in the focus detection step is within a depth of field of the representative in-focus distance, a display is provided to indicate that every focus detection area that includes the region of the specific subject is in focus among the plurality of preset focus detection areas.

* * * * *